United States Patent [19]

Kahle

[11] Patent Number: 5,802,562
[45] Date of Patent: Sep. 1, 1998

[54] INFORMATION PROCESSING SYSTEM AND INCLUDING A SUPPLEMENTAL MEMORY AND METHOD OF OPERATION

[75] Inventor: James Allen Kahle, Austin, Tex.

[73] Assignee: International Business Machines Corporation, Armonk, N.Y.

[21] Appl. No.: 620,862

[22] Filed: Mar. 22, 1996

Related U.S. Application Data

[63] Continuation of Ser. No. 130,604, Oct. 1, 1993, abandoned.

[51] Int. Cl.[6] ........................................... G06F 12/08
[52] U.S. Cl. .................. 711/122; 711/137; 711/138; 711/146
[58] Field of Search ................. 395/444, 445, 395/250, 872, 452, 453, 464, 465, 473, 494; 711/122, 137, 138, 146

[56] References Cited

U.S. PATENT DOCUMENTS

| | | | |
|---|---|---|---|
| 4,189,770 | 2/1980 | Gannon et al. | 395/425 |
| 4,268,907 | 5/1981 | Porter et al. | 395/425 |
| 4,363,095 | 12/1982 | Woods et al. | 395/425 |
| 4,378,591 | 3/1983 | Lamay | 395/425 |
| 4,719,568 | 1/1988 | Carrubba et al. | 395/425 |
| 4,853,846 | 8/1989 | Johnson et al. | 395/281 |
| 5,119,485 | 6/1992 | Ledbetter, Jr. et al. | 395/473 |
| 5,123,095 | 6/1992 | Papadopoulos et al. | 395/375 |
| 5,201,041 | 4/1993 | Bohner et al. | 395/465 |
| 5,317,718 | 5/1994 | Jouppi | 395/425 |
| 5,355,467 | 10/1994 | MacWilliams et al. | 395/473 |
| 5,420,994 | 5/1995 | King et al. | 395/425 |
| 5,454,093 | 9/1995 | Abdulhafiz et al. | 395/460 |
| 5,530,941 | 6/1996 | Weisser et al. | 395/478 |
| 5,566,324 | 10/1996 | Kass | 395/487 |
| 5,586,295 | 12/1996 | Tran | 395/464 |

FOREIGN PATENT DOCUMENTS

| | | |
|---|---|---|
| 0449540A2 | 3/1991 | European Pat. Off. . |
| 4335475A1 | 10/1993 | Germany . |

OTHER PUBLICATIONS

*Computer Architecture News*, May 19, 1991, "An Architecture for Software–Controlled Data Prefetching", A. Klaiber, H. Levey, pp. 43–53.

*Computer Architecture News*, May 21, 1993, "Limitations of Cache Prefetching on a Bus–Based Multiprocessor", D. Tullsen, S. Eggers, pp. 270–288.

Primary Examiner—Eddie P. Chan
Assistant Examiner—Hiep T. Nguyen
Attorney, Agent, or Firm—Michael A. Davis, Jr.; Leslie A. Van Leeuwen

[57] ABSTRACT

An information processing system and method of operation are provided. In response to a first instruction, a supplemental memory stores first information from a system memory. In response to a second instruction, a cache memory stores second information from the supplemental memory if the first information includes the second information and from the system memory otherwise.

40 Claims, 4 Drawing Sheets

INFORMATION PROCESSING SYSTEM AND INCLUDING A SUPPLEMENTAL MEMORY AND METHOD OF OPERATION

This is a continuation of application Ser. No. 08/130,604 filed Oct. 1, 1993, now abandoned.

TECHNICAL FIELD

This patent application relates in general to systems for processing information and in particular to an information processing system and method of operation.

BACKGROUND OF THE INVENTION

Many systems for processing information include both a system memory and a cache memory. A cache memory is a relatively small high-speed memory that stores a copy of information from one or more portions of the system memory. Frequently, the cache memory is physically distinct from the system memory. Such a cache memory can be integral with a processor device of the system or be non-integral with the processor.

Information can be copied from a portion of the system memory into the cache memory. The information in the cache memory can be modified. Further, modified information from the cache memory can be copied back to a portion of the system memory.

In response to instructions, execution units of the processor are able to process information stored in the cache memory. Such instructions include memory instructions for transferring data information between the cache memory and registers of the processor. In a cache miss situation where information for a memory instruction (such as a "load/store" instruction or a "read/write" instruction) is not stored in the cache memory, such information is requested from the system memory. A significant amount of delay can occur while waiting for information from the system memory in response to a cache miss situation.

To reduce negative consequences of such a cache miss situation, the processor can support a prefetch instruction (such as a "touch load" instruction) for loading the cache memory with data information from a specified address within the system memory well in advance of the information being used for another instruction of the processor. Nevertheless, if the prefetch instruction itself results in a cache miss situation, and if the cache memory is a "blocking" cache memory, then additional memory instructions are blocked from using the cache memory until information is received from the system memory. The additional memory instructions are blocked irrespective of whether they specify information already stored in the cache memory.

Accordingly, with previous blocking cache memories, such a prefetch instruction is relatively ineffective and possibly even degrades the performance of the processor. With previous techniques, a prefetch operation is significantly less practical unless the cache memory is made non-blocking. In a non-blocking cache memory, additional memory instructions are not blocked from using the cache memory if they specify information already stored in the cache memory.

Nevertheless, logic for a non-blocking cache memory is more complex than logic for a blocking cache memory. Moreover, it is difficult to verify proper operation of a non-blocking cache memory because additional memory instructions are not blocked from using the cache memory even while waiting for information from the system memory.

Thus, a need has arisen for an information processing system and method of operation, in which a prefetch instruction is effective for a system having a blocking cache memory. Moreover, a need has arisen for an information processing system and method of operation, in which negative consequences of a cache miss situation are reduced.

SUMMARY OF THE INVENTION

In an information processing system and method of operation, a supplemental memory stores first information from a system memory in response to a first instruction. In response to a second instruction, a cache memory stores second information from the supplemental memory if the first information includes the second information and from the system memory otherwise.

It is a technical advantage of the present invention that a prefetch instruction is effective for a system having a blocking cache memory.

It is another technical advantage of the present invention that negative consequences of a cache miss situation are reduced.

BRIEF DESCRIPTION OF THE DRAWINGS

An exemplary embodiment of the present invention and its advantages are better understood by referring to the following descriptions and accompanying drawings, in which.

DETAILED DESCRIPTION

An exemplary embodiment of the present invention and its advantages are better understood by referring to FIGS. 1–4 of the drawings, like numerals being used for like and corresponding parts of the accompanying drawings.

Figure 1:
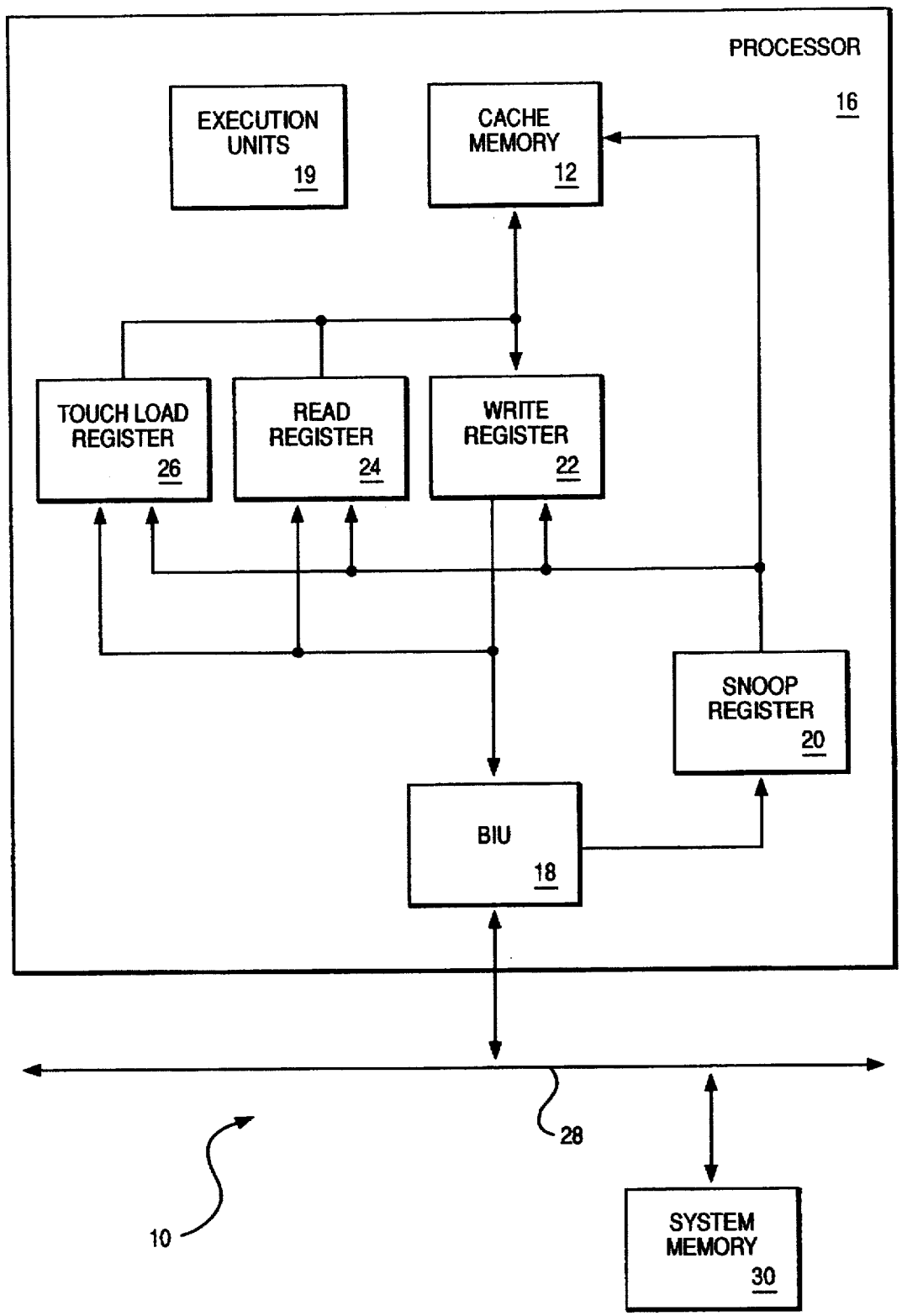
FIG. 1 is a block diagram of an information processing system according to the preferred embodiment.

FIG. 1 is a block diagram of an information processing system, indicated generally at 10, according to the preferred embodiment. In system 10, a cache memory 12 is integral with a processor 16. Processor 16 is a single integrated circuit superscalar microprocessor. In an alternative embodiment, cache memory 12 is non-integral with processor 16. In another alternative embodiment, processor 16 is a multi-chip microprocessor. In yet another alternative embodiment, processor 16 is a non-superscalar processor.

Processor 16 includes a bus interface unit ("BIU") 18, a snoop register 20, a write register 22, and a read register 24. Moreover, processor 16 includes execution units 19. In a significant aspect of the preferred embodiment, processor 16 further includes a prefetch memory 26 formed by a touch load register ("TLR"). In addition to processor 16, system 10 includes a system bus 28 and a system memory 30 connected thereto. Also, BIU 18 of processor 16 is connected to system bus 28.

Prefetch memory 26 is a supplemental memory, in that prefetch memory 26 is additional to system memory 30 and cache memory 12 within system 10. Processor 16 inputs data information from an address within system memory 30. Such data information is input by BIU 18 from system memory 30 through system bus 28, and the data information is stored into read register 24 from BIU 18. At a suitable moment, the data information is stored into cache memory 12 from read register 24. Processor 16 associates the data information with its corresponding address by storing address information together with the data information.

Similarly, processor outputs data information to an address within system memory 30. Such data information is stored into write register 22 from cache memory 12. At a suitable moment, the data information is output from write register 22 to BIU 18, and BIU 18 outputs the data information to system memory 30 through system bus 28. The data information is stored at its corresponding address within system memory 30.

For maintaining coherency of stored data information, processor 16 snoops address information on system bus 28. Such address information is input by BIU 18 from system bus 28, and the address information is then stored into snoop register 20 from BIU 18. The address information stored in snoop register 20 is compared with address information in cache memory 12, in write register 22, and in read register 24. Significantly, the address information stored in snoop register 20 is further compared with address information in prefetch memory 26 (TLR 26 in FIG. 1). If the address information stored in snoop register 20 matches address information stored in cache memory 12, in write register 22, in read register 24 or in prefetch memory 26, then processor 16 responds with appropriate coherency action.

In response to instructions, execution units 19 process information stored in cache memory 12. These instructions include memory instructions for transferring data information between cache memory 12 and registers of processor 16. In a cache miss situation where information for a memory instruction (such as a "load/store" instruction or a "read/write" instruction) is not stored in cache memory 12, processor 16 requests such information from system memory 30. A significant amount of delay can occur while processor 16 waits for information from system memory 30 in response to a cache miss situation.

In the preferred embodiment, cache memory 12 is a "blocking" cache memory. Advantageously, logic for a blocking cache memory is less complex relative to logic for a non-blocking cache memory. Accordingly, while processor 16 waits for information from system memory 30 in response to a cache miss situation, additional memory instructions are blocked from using cache memory 12 until such information is received from system memory 30. The additional memory instructions are blocked irrespective of whether they specify information already stored in cache memory 12. By comparison, in a non-blocking cache memory, additional memory instructions are not blocked from using the cache memory if they specify information already stored in the cache memory.

To reduce negative consequences of such a cache miss situation where processor 16 waits for information from system memory 30, processor 16 advantageously supports a prefetch instruction (such as a "touch load" instruction) for loading cache memory 12 with data information from a specified address within system memory 30 well in advance of the information being used for another instruction of processor 16. With previous blocking cache memories, such a prefetch instruction is relatively ineffective and possibly even degrades the performance of processor 16. This is because, if the prefetch instruction results in a cache miss situation, additional memory instructions are blocked from using cache memory 12 until processor 16 receives information from system memory 30.

Advantageously, processor 16 of the preferred embodiment includes prefetch memory 26. As discussed further hereinbelow in connection with FIGS. 2 and 3, prefetch memory 26 supports the prefetch operation without significantly complicating the logic of blocking cache memory 12.

Figure 2:
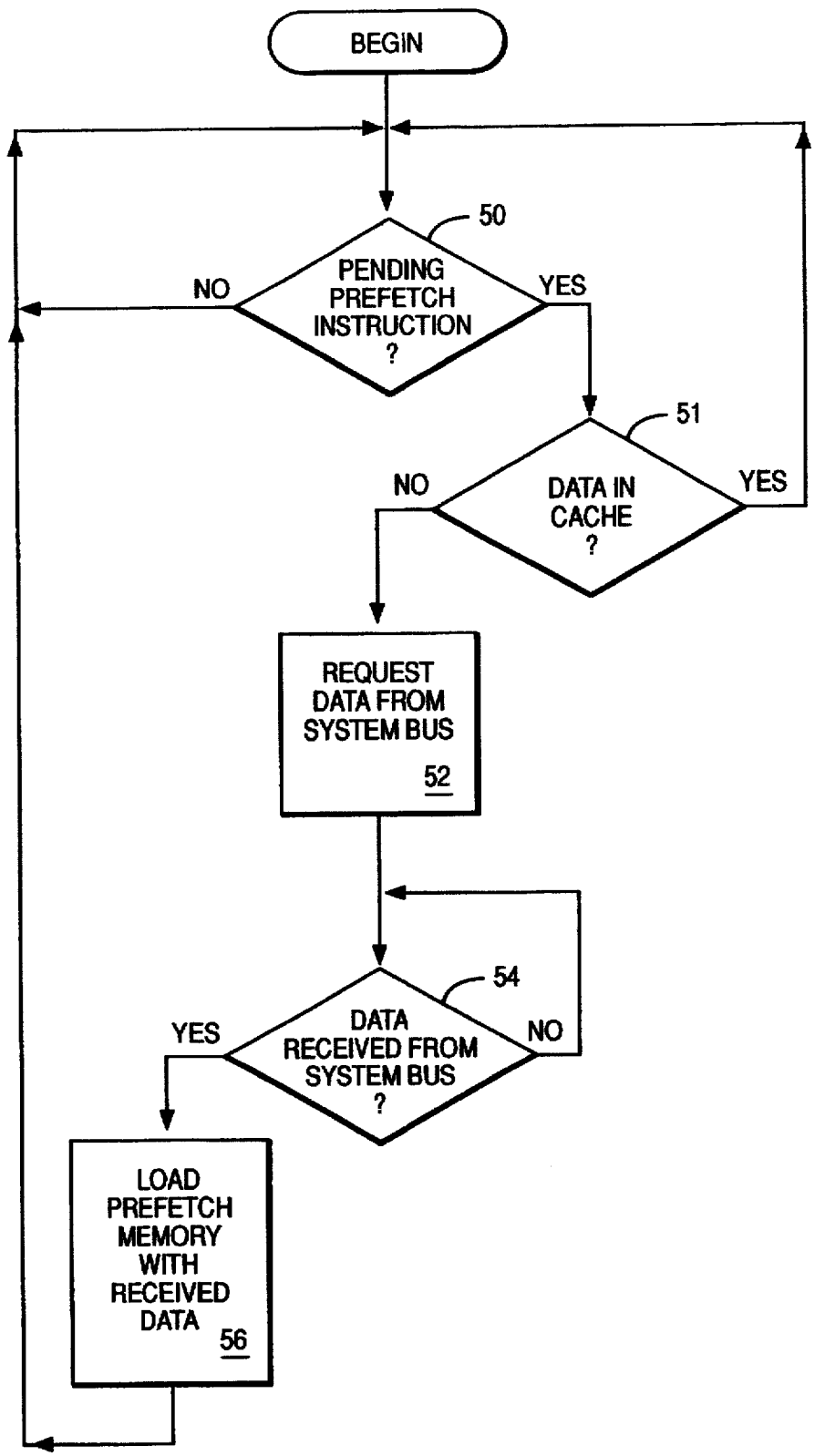
FIG. 2 is a flow chart of a method of operating a prefetch memory of FIG. 1.

FIG. 2 is a flow chart of a method of operating prefetch memory 26 (TLR 26 in FIG. 1). Initially, the method self-loops at a decision step 50 until processor 16 determines a prefetch instruction (such as a "touch load" instruction) is pending execution. In an alternative embodiment, the method self-loops at decision step 50 until processor 16 determines an instruction having a particular type is pending execution; notably, in such an alternative embodiment, the particular type of instruction can be an instruction type other than a prefetch instruction type.

With continued reference to FIG. 2, in response to a prefetch instruction pending execution, the method continues to a decision step 51 where processor 16 determines whether the targeted data information is already stored in cache memory 12. If the targeted data information is already stored in cache memory 12, the method returns to decision step 50. If the targeted data information is not already stored in cache memory 12 (i.e. a cache miss situation), the method continues from decision step 51 to a step 52 where processor 16 requests the targeted data information from system memory 30 through system bus 28.

After step 52, the method self-loops at a decision step 54 until the requested data information is received from system memory 30 through system bus 28. In FIG. 1, BIU 18 inputs the received data information. In response to the data information being received, the method continues to a step 56 where the information is stored into prefetch memory 26 instead of cache memory 12. After step 56, the method returns to decision step 50.

In a significant aspect of the preferred embodiment, since the requested data information for a prefetch instruction is stored into prefetch memory 26 instead of cache memory 12, additional memory instructions (such as a "load/store" instruction or a "read/write" instruction) are not blocked from using cache memory 12 while processor 16 waits for the data information from system memory 30.

Figure 3:
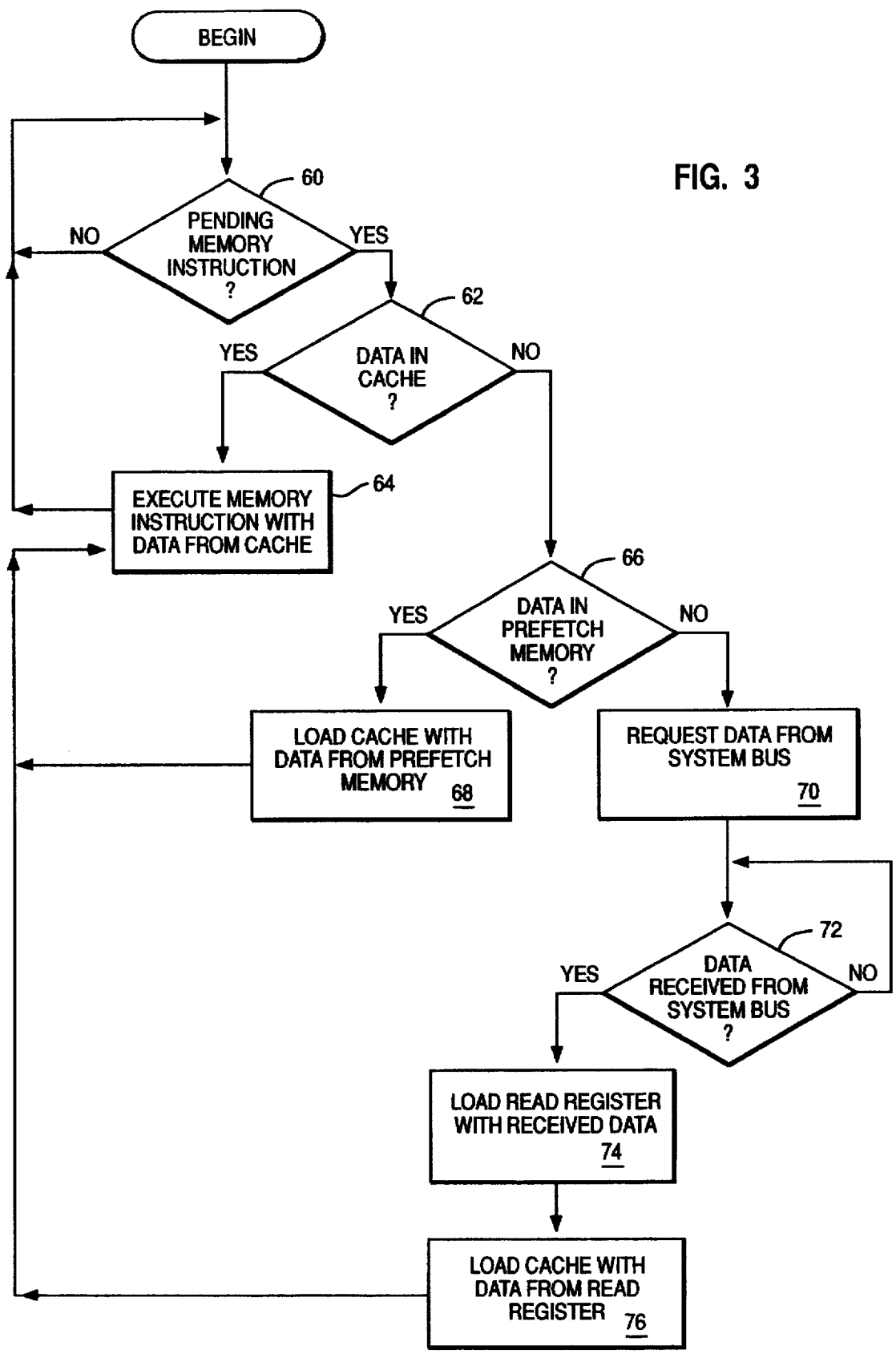
FIG. 3 is a flow chart of a method of operating a cache memory of FIG. 1.

FIG. 3 is a flow chart of a method of operating cache memory 12. Initially, the method self-loops at a decision step 60 until processor 16 determines a memory instruction is pending execution. In response to a memory instruction pending execution, the method continues to a decision step 62 where processor 16 determines whether the targeted data information is already stored in cache memory 12. If the targeted data information is already stored in cache memory 12, the method continues to a step 64 where processor 16 executes the memory instruction with the data information already stored in cache memory 12. After step 64, the method returns to decision step 60.

If the targeted data information is not already stored in cache memory 12, the method continues from decision step 62 to decision step 66 where processor 16 determines whether the targeted data information is stored in prefetch memory 26 (TLR 26 in FIG. 1). If the targeted data information is stored in prefetch memory 26, the method continues to a step 68 where processor 16 stores the targeted data information into cache memory 12 from prefetch memory 26. After step 68, the method continues to step 64.

If the targeted data information is not stored in prefetch memory 26, the method continues from decision step 66 to a step 70 where processor 16 requests the targeted data information from system memory 30 through system bus 28.

After step 70, the method self-loops at a decision step 72 until the requested data information is received from system memory 30 through system bus 28. BIU 18 inputs the received data information. In response to the data information being received, the method continues to a step 74 where the information is stored into read register 24. After step 74, the method continues to a step 76 where processor 16 stores the information into cache memory 12 from read register 24. After step 76, the method continues to step 64.

Accordingly, in a significant aspect of the preferred embodiment, if the targeted data information is not stored in prefetch memory 26, the information is stored into cache memory 12 from system memory 30 without adding the information to prefetch memory 26. Moreover, even in an alternative embodiment where such information is added to prefetch memory 26, cache memory 12 advantageously bypasses prefetch memory 26 when cache memory 12 stores the information from system memory 30. By bypassing prefetch memory 26, cache memory 12 stores the information from system memory 30 more quickly without waiting for prefetch memory 26 to store the information.

Figure 4:
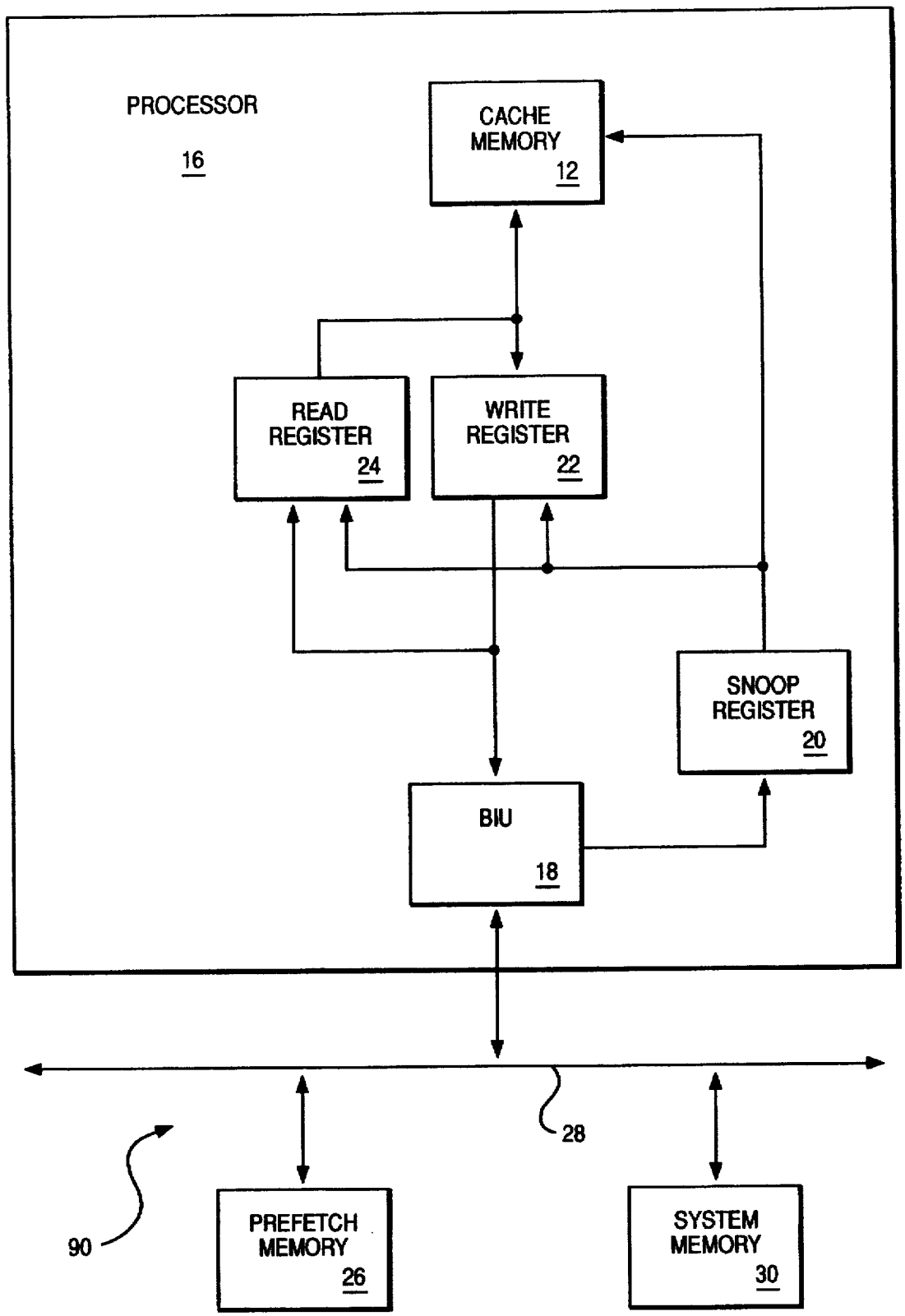
FIG. 4 is a block diagram of an information processing system according to an alternative embodiment.

FIG. 4 is a block diagram of an information processing system, indicated generally at 90, according to an alternative embodiment. In FIG. 4, prefetch memory 26 is not integral with processor 16. Instead, prefetch memory 26 is formed by a memory array connected to system bus 28. Like system 10 of FIG. 1, system 90 operates according to the methods of FIGS. 2 and 3.

Accordingly, at step 52 of FIG. 2, in response to a prefetch instruction, processor 16 outputs a special purpose communication signal on system bus 28 to designate the operation on system bus 28 as a prefetch operation. System bus 28 supports such a special purpose communication signal, and prefetch memory 26 includes logic for responding thereto. In response to the special purpose communication signal on system bus 28, prefetch memory 26 stores information at step 56 of FIG. 2 after such information is received from system memory 30 through system bus 28.

Since the requested data information for a prefetch instruction is stored into prefetch memory 26 instead of cache memory 12, additional memory instructions (such as a "load/store" instruction or a "read/write" instruction) are not blocked from using cache memory 12 while prefetch memory 26 waits for the data information from system memory 30.

Advantageously, prefetch memory 26 is significantly smaller than system memory 30. Accordingly, cache memory 12 is able to input information significantly faster from prefetch memory 26 (steps 66 and 68 of FIG. 2) than from system memory 30 (steps 70–74 of FIG. 2). Like processor 16, prefetch memory 26 of FIG. 4 associates data information with its corresponding address by storing address information together with the data information.

In both FIGS. 1 and 4, prefetch memory 26 operates as a separate cache line for a prefetch operation. If a memory instruction requests information absent from cache memory 12 (i.e. a cache miss situation), yet the information is stored in prefetch memory 26, then the information is transferred from prefetch memory 26 to cache memory 12. Advantageously, in such a situation, the cache miss situation does not result in processor 16 requesting such information from system memory 30. In the embodiment shown in FIG. 1, prior to such a transfer to cache memory 12, the information in prefetch memory 26 is subject to being overwritten by information for a subsequent prefetch operation. By comparison, in the embodiment shown in FIG. 4, information for multiple prefetch operations can be stored simultaneously in prefetch memory 26.

Referring to FIG. 1, if the address information stored in snoop register 28 matches address information stored in prefetch memory 26, then processor 16 invalidates the contents of prefetch memory 26. In such a situation, processor 16 does not cast out information from prefetch memory 26, because information is not modified within prefetch memory 26.

Referring to FIG. 4, for maintaining coherency of stored data information like processor 16, prefetch memory 26 of FIG. 4 includes logic for snooping address information on system bus 28. If the snooped address information matches address information stored in prefetch memory 26, then prefetch memory 26 of FIG. 4 invalidates its data contents corresponding to the snooped address information. With continuing reference to FIG. 4, prefetch memory 26 does not cast out information, because information is not modified within prefetch memory 26.

Notably, in both FIG. 1 and FIG. 4, prefetch memory 26 operates as a level-2 cache memory relative to cache memory 12. Nevertheless, unlike typical previous level-2 cache memories, prefetch memory 26 has a faster access time, less complex logic, and a smaller size than its corresponding level-1 cache memory 12. Prefetch memory 26 is significantly smaller and faster than system memory 30 and also is significantly smaller and faster than cache memory 12.

This is possible because information stored in prefetch memory 26 is not required to be inclusive of all information stored in cache memory 12. Prefetch memory 26 operates as a level-2 cache memory relative to cache memory 12 only for prefetch instructions. Accordingly, cache memory 12 is able to input information significantly faster from prefetch memory 26 (steps 66 and 68 of FIG. 2) than from system memory 30 (steps 70–74 of FIG. 2).

Without prefetch memory 26, a prefetch operation is significantly less practical unless cache memory 12 is made non-blocking. Nevertheless, it is difficult to verify proper operation of a non-blocking cache memory because additional memory instructions are not blocked from using cache memory 12 even while processor 16 waits for information from system memory 30. Moreover, logic for a non-blocking cache memory is more complex than logic for a blocking cache memory. Accordingly, relative to the alternative of cache memory 12 being made non-blocking, the combination of prefetch memory 26 with blocking cache memory 12 is advantageous. Such a combination is non-blocking with respect to prefetch instructions and is blocking with respect to other memory instructions.

Although an exemplary embodiment of the present invention and its advantages have been described in detail hereinabove, they have been described as example and not as limitation. Various changes, substitutions and alterations can be made in the exemplary embodiment without departing from the breadth, scope and spirit of the present invention. The breadth, scope and spirit of the present invention should not be limited by the exemplary embodiment, but should be defined only in accordance with the following claims and equivalents thereof.

What is claimed is:

1. An information processing system, comprising:
   a processor;
   a bus for communicating information;
   a system memory coupled to the bus for storing at least a subset of the information;

a prefetch memory;

a cache memory, integral to said processor; and circuitry coupled to the bus and to the prefetch and cache memories for:

storing first information from the system memory into the prefetch memory in response to a prefetch instruction requesting only the first information;

storing second information into the cache memory in response to a memory instruction requesting the second information, the second information being provided directly from the prefetch memory, independent of said bus, when the first information includes the second information, otherwise the second information being from the system memory without being added to the prefetch memory; and maintaining coherency of the first information in the prefetch memory in response to address information from the bus.

2. The system of claim 1 wherein the cache memory is a blocking cache memory.

3. The system of claim 1 and further comprising a processor coupled to the memories for processing the instructions.

4. The system of claim 3 wherein the cache memory is integral with the processor.

5. The system of claim 3 wherein the prefetch memory and the circuitry are integral with the processor.

6. The system of claim 1 wherein the prefetch memory is smaller than the cache memory.

7. The system of claim 1 wherein the prefetch memory is smaller than the system memory.

8. The system of claim 1 wherein the circuitry invalidates the first information in the prefetch memory in response to a match between the address information from the bus and address information stored in the prefetch memory.

9. The system of claim 1 wherein the circuitry is for:

storing the second information into the cache memory in response to the memory instruction, independent of whether the prefetch memory is waiting for the first information from the system memory.

10. An information processing system, comprising:

a processor;

a bus for communicating information;

a system memory couple to said bus for storing at least a subset of said information;

a supplemental memory;

a cache memory, integral to said processor; and circuitry coupled to said bus and to said supplemental and cache memories for:

storing first information from said system memory into said supplemental memory in response to a first instruction requesting only said first information;

storing second information into said cache memory in response to a second instruction requesting said second information, said second information being provided directly from said supplemental memory, independent of said bus, when said first information includes said second information, otherwise said second information being from said system memory without being added to said supplemental memory; and maintaining coherency of said first information in said supplemental memory in response to address information from said bus.

11. The system of claim 8 wherein said supplemental memory is a prefetch memory.

12. The system of claim 8 wherein said first instruction is a prefetch instruction.

13. The system of claim 8 wherein said cache memory is a blocking cache memory.

14. The system of claim 8 and further comprising a processor coupled to said memories for processing said instructions.

15. The system of claim 14 wherein said cache memory is integral with said processor.

16. The system of claim 14 wherein said supplemental memory and said circuitry are integral with said processor.

17. The system of claim 14 wherein said processor outputs a signal to designate said first instruction to said circuitry in response to said first instruction.

18. The system of claim 17 wherein said circuitry stores said first information into said supplemental memory in response to said signal.

19. The system of claim 8 wherein said supplemental memory is smaller than said cache memory.

20. The system of claim 8 wherein said supplemental memory is smaller than said system memory.

21. The system of claim 8 wherein said circuitry stores said first information into said supplemental memory in response to said first instruction having a first instruction type.

22. The system of claim 21 wherein said circuitry stores said second information into said cache memory in response to said second instruction having a second instruction type.

23. The system of claim 10 wherein said circuitry invalidates said first information in said supplemental memory in response to a match between said address information from said bus and address information stored in said supplemental memory.

24. The system of claim 1 wherein the circuitry is for:

if the first information is absent from the cache memory, storing the first information from the system memory into the prefetch memory in response to the prefetch instruction.

25. The system of claim 24 wherein the circuitry is for:

only if the first information is absent from the cache memory, storing the first information from the system memory into the prefetch memory in response to the prefetch instruction.

26. The system of claim 10 wherein said circuitry is for:

storing said second information into said cache memory in response to said second instruction, independent of whether said supplemental memory is waiting for said first information from said system memory.

27. The system of claim 10 wherein said circuitry is for:

if said first information is absent from said cache memory, storing said first information from said system memory into said supplemental memory in response to said first instruction.

28. The system of claim 27 wherein said circuitry is for:

only if said first information is absent from said cache memory, storing said first information from said system memory into said supplemental memory in response to said first instruction.

29. A method of operating an information processing system, having a processor included therein, comprising the steps of:

communicating information through a bus;

storing at least a subset of said information in a system memory;

in response to a first instruction requesting only first information, storing said first information into a supplemental memory from said system memory;

in response to a second instruction requesting second information, directly storing, independent of said bus, said second information from said supplemental memory to a cache memory, integral to said processor, when said first information includes said second information, otherwise said second information being from said system memory without being added to said supplemental memory; and maintaining coherency of said first information in said supplemental memory in response to address information from said bus.

30. The method of claim 29 wherein said step of storing said first information into said supplemental memory comprises the step of storing said first information into a prefetch memory.

31. The method of claim 29 wherein said step of storing said first information in response to said first instruction comprises the step of storing said first information in response to a prefetch instruction.

32. The method of claim 29 wherein said step of storing said second information into said cache memory comprises the step of storing said second information into a blocking cache memory.

33. The method of claim 29 and further comprising the step of outputting a signal in response to said first instruction.

34. The method of claim 33 wherein said step of storing said first information in response to said first instruction comprises the step of storing said first information in response to said signal.

35. The method of claim 29 wherein said step of storing said first information comprises the step of storing said first information in response to said first instruction having a first instruction type.

36. The method of claim 35 wherein said step of storing said second information comprises the step of storing said second information in response to said second instruction having a second instruction type.

37. The method of claim 23 wherein said step of maintaining coherency of said first information in said supplemental memory comprises said step of invalidating said first information in said supplemental memory in response to a match between said address information from said bus and address information stored in said supplemental memory.

38. The system of claim 29 wherein said step of storing said second information comprises the step of:

storing said second information into said cache memory in response to said second instruction, independent of whether said supplemental memory is waiting for said first information from said system memory.

39. The system of claim 29 wherein said step of storing said first information comprises the step of:

if said first information is absent from said cache memory, storing said first information from said system memory into said supplemental memory in response to said first instruction.

40. The system of claim 39 wherein said step of storing said first information comprises the step of:

only if said first information is absent from said cache memory, storing said first information from said system memory into said supplemental memory in response to said first instruction.

* * * * *

UNITED STATES PATENT AND TRADEMARK OFFICE
CERTIFICATE OF CORRECTION

PATENT NO. : 5,802,562
DATED : Sept. 1, 1998
INVENTOR(S) : Kahle

Page 1 of 3

It is certified that error appears in the above-identified patent and that said Letters Patent is hereby corrected as shown below:

On the title page, and Column 1, line 1,
Item [54], in the title after "SYSTEM" please delete "AND".

In the Claims:

Please delete Claim 1 and insert therefore --An information processing system, comprising:
- a bus for communicating information;
- a system memory coupled to the bus for storing at least a subset of the information;
- a prefetch memory;
- a cache memory; and
- circuitry coupled to the bus and to the prefetch and cache memories for: storing first information from the system memory into the prefetch memory in response to a prefetch instruction requesting only the first information; storing second information into the cache memory in response to a memory instruction requesting the second information, the second information being from the prefetch memory if the first information includes the second information, otherwise the second information being from the system memory without being added to the prefetch memory; and maintaining coherency of the first information in the prefetch memory in response to address information from the bus.--;

Please delete Claim 10 and insert therefore --An information processing system, comprising:
- a bus for communicating information;
- a system memory coupled to said bus for storing at least a subset of said information;
- a supplemental memory;

UNITED STATES PATENT AND TRADEMARK OFFICE
CERTIFICATE OF CORRECTION

PATENT NO. : 5,802,562
DATED : Sept. 1, 1998
INVENTOR(S) : Kahle

It is certified that error appears in the above-identified patent and that said Letters Patent is hereby corrected as shown below:

a cache memory; and circuitry coupled to said bus and to said supplemental and cache memories for:
   storing first information from said system memory into said supplemental memory in response to a first instruction requesting only said first information; storing second information into said cache memory in response to a second instruction requesting said second information, said second information being from said supplemental memory if said first information includes said second information, otherwise said second information being from said system memory without being added to said supplemental memory; and maintaining coherency of said first information in said supplemental memory in response to address information from said bus.--;

UNITED STATES PATENT AND TRADEMARK OFFICE
CERTIFICATE OF CORRECTION

PATENT NO. : 5,802,562
DATED : Sept. 1, 1998
INVENTOR(S) : Kahle

It is certified that error appears in the above-identified patent and that said Letters Patent is hereby corrected as shown below:

Please delete Claim 29 and insert therefore --A method of operating an information processing system, comprising the steps of:
    communicating information through a bus;
    storing at least a subset of said information in a system memory;
    in response to a first instruction requesting only first information, storing said first information into a supplemental memory from said system memory;
    in response to a second instruction requesting second information, storing said second information into a cache memory from said supplemental memory if said first information includes said second information, otherwise said second information being from said system memory without being added to said supplemental memory; and
    maintaining coherency of said first information in said supplemental memory in response to address information from said bus.--.

Signed and Sealed this

Twenty-second Day of June, 1999

Attest:

Attesting Officer

Q. TODD DICKINSON

Acting Commissioner of Patents and Trademarks